United States Patent [19]

Zabaleta

[11] 4,080,133
[45] Mar. 21, 1978

[54] APPARATUS FOR FORMING SYNTHETIC PLASTICS BODIES BY BLOW MOULDING

[76] Inventor: Julian Arizmendi Zabaleta, Legazpia, Spain

[21] Appl. No.: 646,346

[22] Filed: Jan. 2, 1976

[30] Foreign Application Priority Data

Feb. 22, 1975 Spain .................. 435004

[51] Int. Cl.² .................................. B29D 23/03
[52] U.S. Cl. .................................. 425/174; 425/526
[58] Field of Search ............ 425/326 B, 302, 307, 425/387 B, 305 B, 381, 407, 174, 174.6, 174.8 R, 174.8 E, 526

[56] References Cited

U.S. PATENT DOCUMENTS

| | | | |
|---|---|---|---|
| 2,890,483 | 6/1959 | Soubier | 425/326 B |
| 3,596,320 | 8/1971 | Manning | 425/407 |
| 3,764,250 | 10/1973 | Waterloo | 425/326 B |
| 3,764,253 | 10/1973 | Waterloo | 425/381 |
| 3,870,446 | 5/1975 | Seefluth | 425/387 B |
| 3,901,637 | 8/1975 | Eggert | 425/387 B |
| 3,910,741 | 10/1975 | Mehnert | 425/326 B |
| 3,954,370 | 5/1976 | Pollock et al. | 425/326 B |

*Primary Examiner*—Richard B. Lazarus
*Attorney, Agent, or Firm*—Eyre, Mann, Lucas & Just

[57] ABSTRACT

An integral blow-moulding machine heats and extrudes plastic parisons having variable wall thicknesses directly between the opened half moulds of a continuously rotating ferris wheel type blow moulder. The parisons are severed and thereupon grasped by hydraulically closed half moulds. An electric discharge device is adapted to softening part or all of the parison during extrusion. Air injection is performed using a conventional extensible injection needle. After blowing the half moulds are hydraulically opened while the blown object is held by pneumatic grippers. During the extraction procedure the flash is removed from top and bottom of the blow moulded object by hydraulically operated means.

2 Claims, 14 Drawing Figures

APPARATUS FOR FORMING SYNTHETIC PLASTICS BODIES BY BLOW MOULDING

This invention relates to apparatus for forming synthetic plastic bodies by blow moulding.

The range of synthetic plastics bodies which can be produced by the blow moulding process has continuously grown and increased in importance, this range of bodies comprising articles such as bottles, caps, containers, and even dolls.

Hitherto the production of these plastics articles by blow moulding has been carried out with the use of extremely large installations. Although in some instances it has been found possible to produce the plastics mouldings without employing manual labour, this has been achieved at the cost of utilising an extremely long production line constituted by units each of which comprises a single stage in the overall blow moulding process.

The present invention provides apparatus for forming synthetic plastics bodies by blow moulding, comprising: a unit for continuously producing plastics tubular profiles, the unit communicating with a supply device for the infeed into the unit of plastics material to be used for moulding, the unit including an annular outlet mouth for the egress of the tubular profiles; cutting means mounted downstream of the annular outlet mouth and synchronously operable to cut the tubular profile into sections; and a pair of uniformly and continuously rotatable plates which carry on their mutually facing surfaces at least one pair of half-moulds, the half-moulds being connected to the plates through the separating means which act synchronously and in relation to the other working steps of the apparatus to cause the half-moulds of each pair of two oppositely-located half-moulds to approach a tubular profiled section, in the course of their rotation, the tubular profiled section being grasped by the pair of half-moulds and caused to rotate with this pair of half-moulds.

A preferred embodiment of the apparatus according to the present invention is provided with means for introducing the starting or raw plastics material, the latter being treated until a tubular profile has been formed from the plastics starting material. An outlet for egress of the tubular profile may be defined between an outlet mouth and an extension which is inserted in the outlet mouth and which has associated therewith means for moving the extension axially relative to the outlet mouth. Accordingly, this extension may be inserted to different extents in the outlet mouth, thereby varying the width of the annular space or passage forming the outlet, with consequent variation in thickness of the tubular profile being formed. In this way the thickness of the tubular profile emerging from the outlet may be varied according to the particular intended use of the tubular profile. Thus it may be ensured that the plastics bodies produced have different thicknesses along their length.

Means for treating the tubular profiles emerging from the outlet may be provided where the tubular profile emerges from the outlet, these means being capable of establishing an electric arc across the tubular profile. This electric arc treatment permits the tubular profiles to have instructions or other information printed on their surfaces, such printed impressions being necessary to enable finished articles produced from the tubular profiles to be effectively marketed.

The apparatus incorporates cutting means which are located close to the outlet mouth, these cutting means being intermittently operable at specific intervals in the working cycle of the apparatus and in synchronism with one another to cut the tubular plastics profile into separate sections, each of which sections will form a respective finished moulded article.

The apparatus also incorporates a pair of plates which are continuously and uniformly rotatable and which are mounted on a driving shaft in such a way that the tubular plastics profiles fall between the plates, the plates carrying on their mutually-facing surfaces at least one pair of separate half-moulds, each half-mould on one of the plates cooperating with a corresponding half-mould on the other plate to form pairs of moulds. These half-moulds are coupled to means for moving them relative to the plates which carry them. These means act in mutual synchronism to advance each pair of half-moulds, causing the latter to approach one another in the course of their rotation, towards a tubular profiled section, the pair of half-moulds then closing on this tubular profiled section and carrying the latter with them in the course of their further rotation.

Air injecting means may be provided to then blow air into the tubular profiled section so as to shape the latter into conformity with the shape of the mould which is carrying it, thus causing the tubular profiled section to assume the shape of the mould and hence the required shape of the final blow moulding.

This shaping of the blow moulded article by causing the moulds to grip the tubular profiled sections without stopping (i.e. the moulds continuing to rotate) affords appreciable advantages in terms of greater speed and better synchronisation. This is because the pairs of half-moulds successively grasp the tubular profiled sections one after the other as these sections are formed and when the moulds reach the vicinity of these tubular sections.

Located in the periphery of and between the plates may be provided a stationary assembly comprising a hydraulically actuable and synchronised gripper unit, which is mounted to be rotatable about a shaft on which it is mounted so that, in a preferably controlled and synchronised operation, the pairs of half-moulds of the plates arrive, in the course of their rotation, at this position when they are moving apart from one another so as to free the moulded article. The gripper unit then graps the moulded article and rotates to carry the moulded article with it in an outward direction, and then deposits the moulded article on a receiving stand where cutter elements are synchronously actuable to remove burrs from the moulded article.

In this way, as the pairs of half-moulds, together with the moulded articles which they contain, move through this position, the articles are grasped, extracted, and finished, leaving the pairs of half-moulds free to receive other tubular profiled sections.

The apparatus according to the invention can carry out the whole process of forming synthetic plastics bodies by blow moulding, starting from the commercially available plastics material to the point at which this plastics material is transformed into finished plastics bodies which are ready to be put to practical use.

Thus the apparatus enables the whole process of forming plastics bodies by blow moulding to be carried out at a high production rate. A further important advantage is that the moulded bodies thus formed are better made then bodies formed on other known blow moulding apparatuses.

The invention will be further described, by way of example only with reference to the accompanying drawings, in which:-

The apparatus shown in the drawings comprises a fixed bed plate 1 on which the elements of the apparatus are mounted and which on one side supports a structure which includes a platform 2 which can be moved up and down by means of a hydraulic cylinder 102 and which supports a first carriage or slide 3. This carriage or slide 3 supports in turn a further carriage or slide 4 by means of guide couplings which enable the carriage or slide 4 to be positioned as required. Thus, the carriage or slide 3 can be shifted in the longitudinal direction by means of screw threaded elements 104 and the carriage or slide 4 is shiftable in the transverse direction by means of additional screw threaded elements 106.

An extrusion head 5 is installed on the carriage or slide 4 and itself carries an extrusion unit for forming a tubular profile from synthetic plastics material. The extrusion head 5 is capable of vertical, longitudinal and transverse positional adjustment by means of the above-described positioning means. The extrusion head 5 incorporates a hydraulic motor 6 the casing of which is attached coaxially to a structure comprising a tube 8 and a worm screw conveyor 9 which can be driven by the hydraulic motor 6. This structure supported by the hydraulic motor also includes a feed hopper 7 by means of which synthetic plastics material for extrusion is introduced into the structure, and also an outlet mouth 10. In this way the screw conveyor 9 conveys the synthetic plastics material from the inlet hopper 7 to the outlet mouth 10. The tube 8 incorporates electrical resistance elements 108 which serve to heat the synthetic plastic material during its passage from the inlet hopper to the outlet mouth, so that the plastics material assumes a pasty consistency when it reaches the outlet mouth 10.

Figure 3:
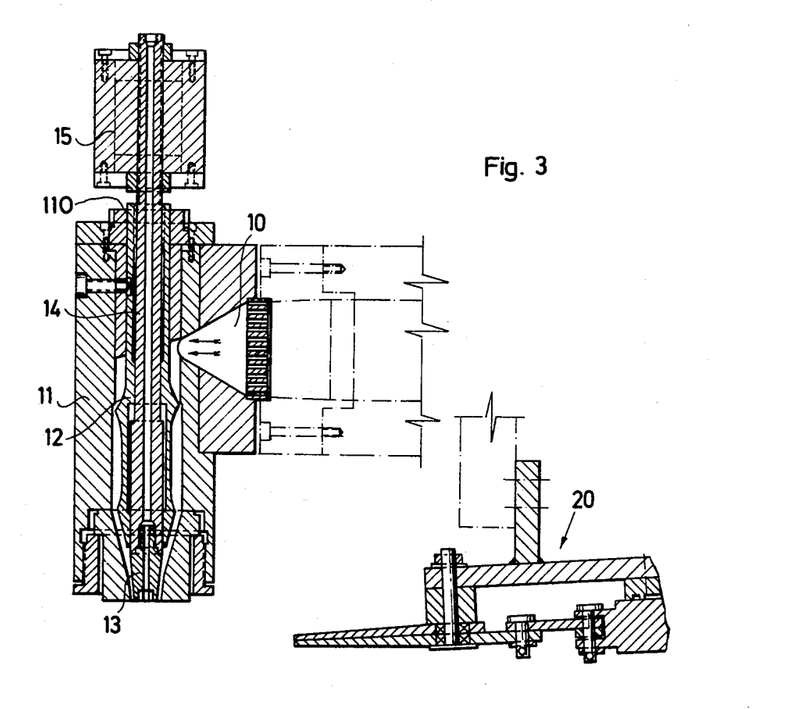
FIGS. 3, 4 and 5 are partly sectional views illustrating the outlet mouth from which the tubular plastics profile emerges.

A tubular column 11 is laterally attached to the end of the structure which incorporates the tube 8 and the screw conveyor 9, and communicates with the outlet mouth 10 so that it can receive the pasty plstics material from the outlet mouth 10. The tubular column 11 (see FIG. 3) comprises an inner tube 12 which defines with the column 11 which surrounds it an annular feed chamber through which the pasty plastics substance is passed. The inner tube 12 also defines with the column 11 constrictions for compressing the synthetic plastics substance, and its position is adjustable by means of a screw threaded connection 110 in order to alter the magnitude of the constrictions according to the particular characteristics required when any batch of blow mouldings is being produced.

Figure 1:
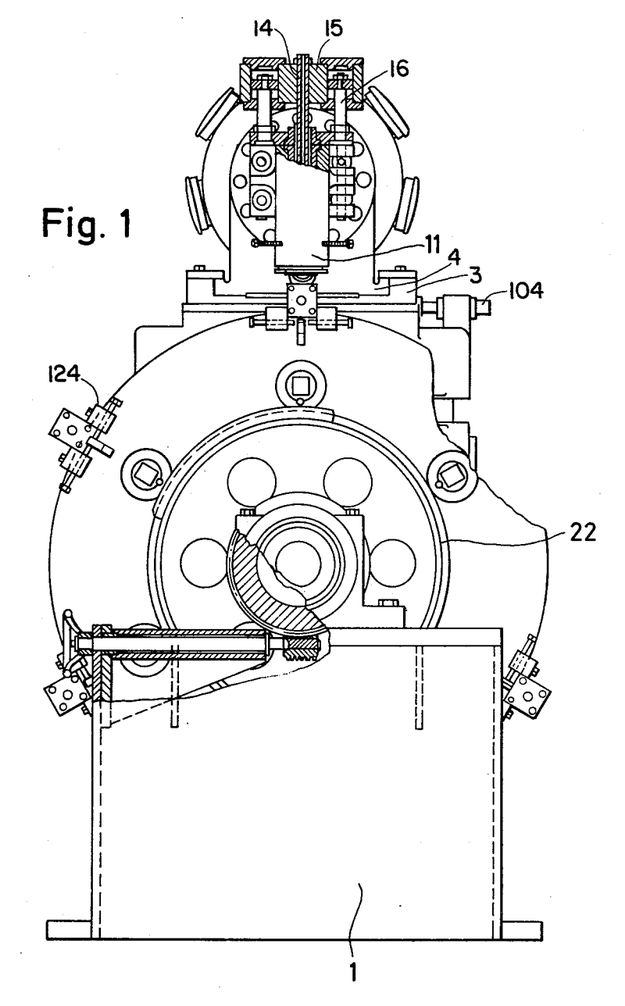
FIG. 1 is a front view, partly in section, of apparatus according to the invention for forming synthetic plastics bodies by blow moulding.
Figure 2:
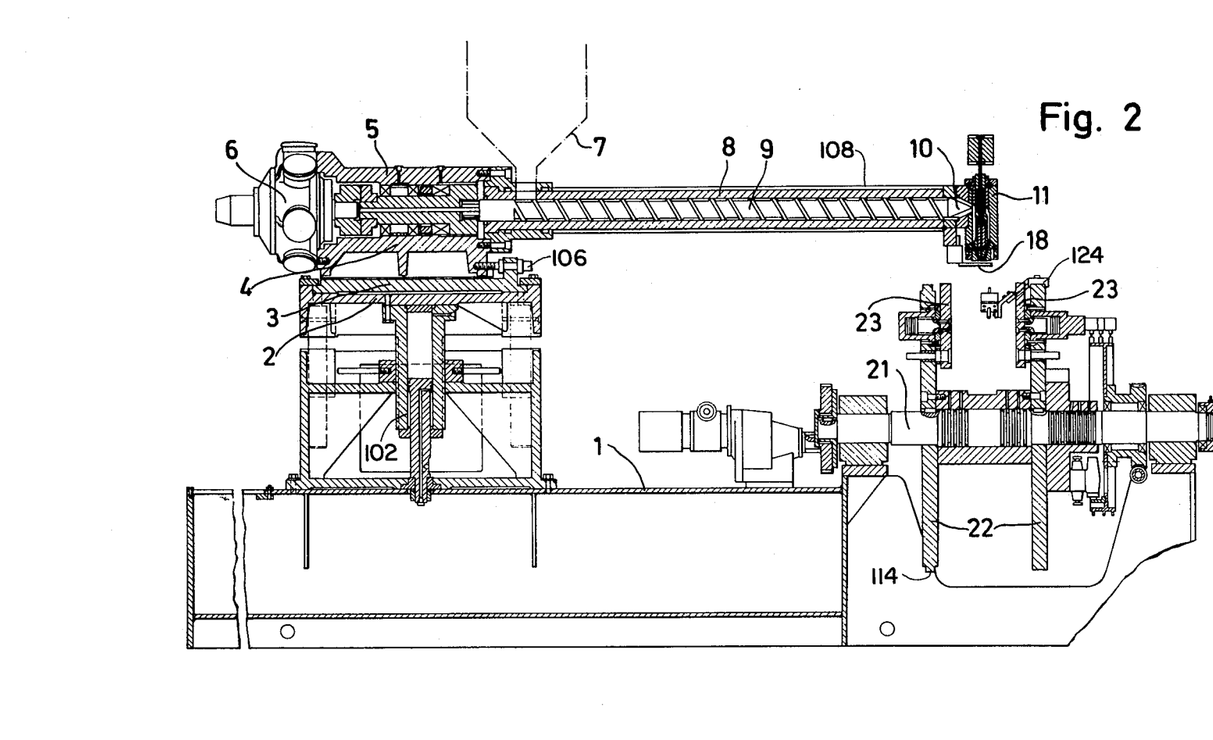
FIG. 2 is a longitudinal cross-sectional view of the apparatus shown in FIG. 1.
Figure 4:
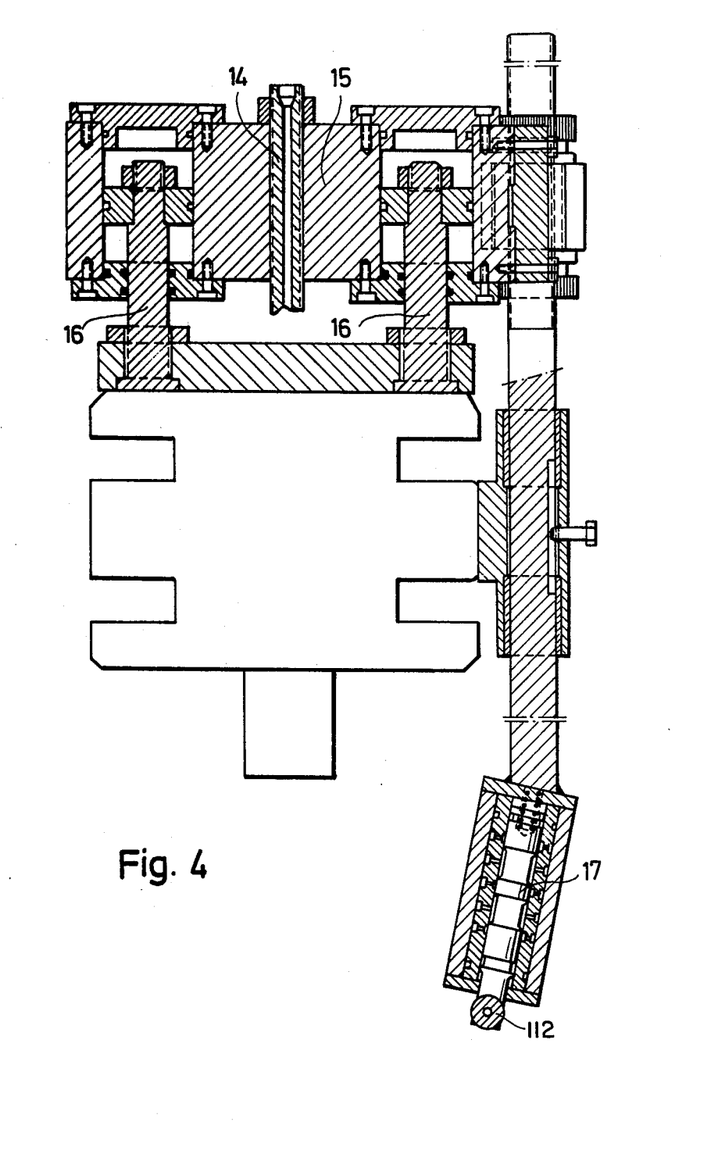
Figure 5:
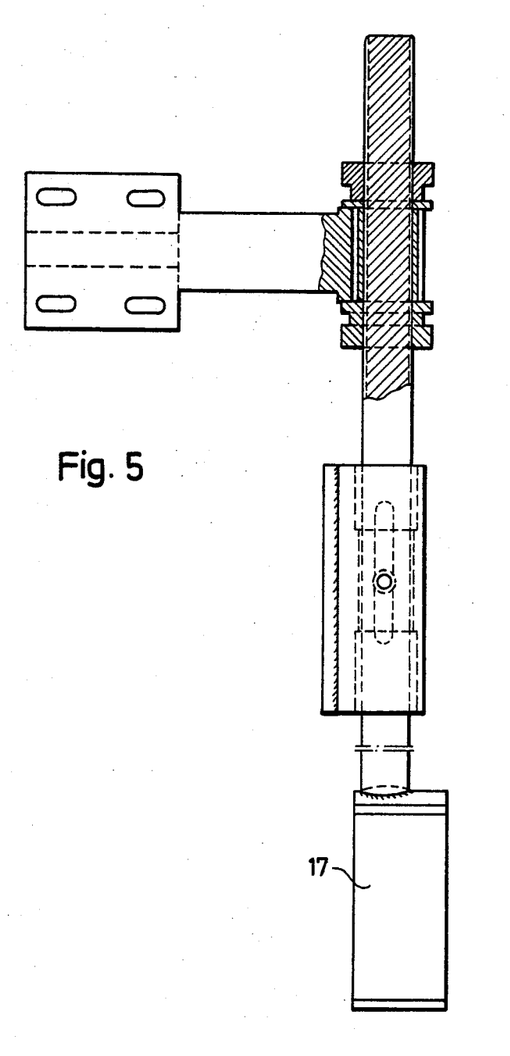

The synthetic plastics product emerges continuously from the column 11 in the tubular form imparted to it in this column through an annular outlet mouth defined between a frusto-conical outlet mouth of the column 11 and a frusto-conical extension 13 which is attached to the lower end of a central core 14. This core 14 is telescopically slidable within the inner tube 12 and extends downwardly from a movable block 15 to which it is attached and which is itself operatively connected to the column 11 through the intermediary of hydraulic cylinders 16 (see FIG. 4). These hydraulic cylinders 16 are controlled by a valve 17 which is attached to an arm 112 which bears upon a cam 114 attached to the periphery of one of the mould-bearing plates (22 see FIG. 2). The valve 17 is a hydraulic spool control valve containing a control spool 116 of conventional design which, when translated axially within the valve 17, causes pressurized hydraulic fluid, from a source not shown, to be valved into the pistons 16 by way of fluid channels not shown. Thus, as the cam 114 causes the control spool 116 to move up and down, the valve 17 controls the hydraulic cylinders 16 which in turn cause the core 14 to be raised or lowered. When the core 14 is thus raised or lowered the position of the extension 13 attached to the core 14 is correspondingly altered, so that the extension is disposed in the outlet mouth of the column to a greater or lesser extent.

The extension 13 thus controls the thickness of the extruded tubular profile. The width of the annular outlet mouth of the column 11 and thus the thickness of the extruded tubular profile are thus altered as a function of the shape of the cam.

Figure 6:
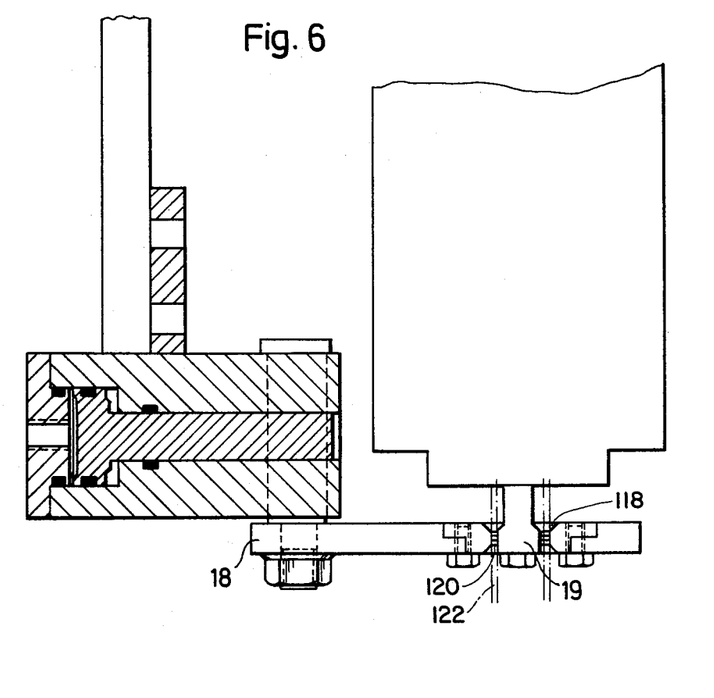
FIGS. 6 and 7 are partly sectional views illustrating the unit for heating the tubular plastics profiles, which can also be seen in FIG. 2.
Figure 7:
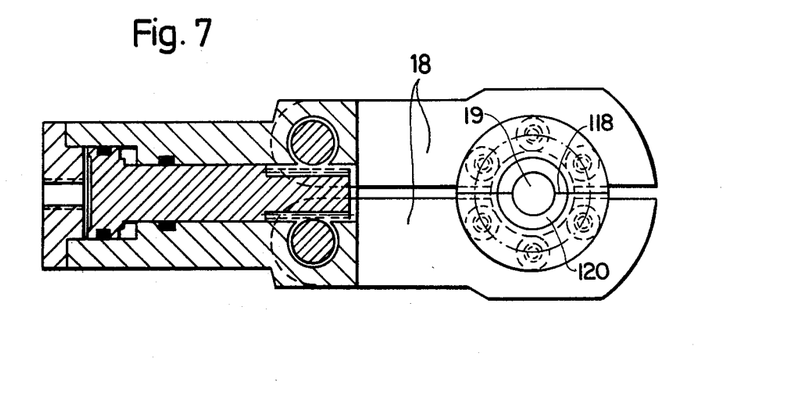

Heating means are attached to and extend downwardly from the lower end of the structure which incorporates the tube 8 and the screw conveyor 9, these heating means heating the continuously extruded tubular profile so that the latter will be suitably prepared for receiving printed instructions or other information thereon. These heating means are constituted by gripper jaws 18 which are provided with actuating elements to synchronously open and close the gripper jaws 18. The jaws 18 carry heating rings 118 which conform to the shape of the extruded tubular profiles, so that the tubular profiles pass through the heating rings. A stud-like electrode 19 (FIG. 6) extends downwardly and cooperates with the heating rings 118, so that an electric arc shown at 120, FIGS. 6 and 7, can be established between the electrode 19 and the heating rings 118 across the extruded tubular profile 122 passing through the heating rings 118. The extruded material is heated by internal resistance to the passage of the electric arc 120 therethrough.

A pair of cutters 20 (FIG. 3) is suspended from the apparatus frame and slices the extruded tubular profile as the latter emerges from the heating means.

Two rotatable plates 22 (FIG. 8) are coupled to a drive shaft 21 which is mounted on the bedplate 1 and is driven by a motor. These plates 22 are arranged to face one another and define between them a space through which the extruded tubular profile descends after it has left the outlet mouth. The plates 22 rotate continuously and uniformly and their faces support pairs of half-moulds 23, each mutually-facing pair of half-moulds 23 (one of which is attached to each of the mutually facing plates 22) defining a complete mould when brought together. Thus, the half-moulds 23 are mounted on their respective plates 22 with the interposition of respective actuating cylinders and guide rods. The actuating cylinders can be operated so that, with the assistance of the guide rods, they cause their associated half-moulds 23 to move away from their associated plates 22 and thus move towards one another, these movements of the half-moulds 23 relative to their associated plates 22 taking place in a timed manner relative to the other working movements of the apparatus.

Figure 8:
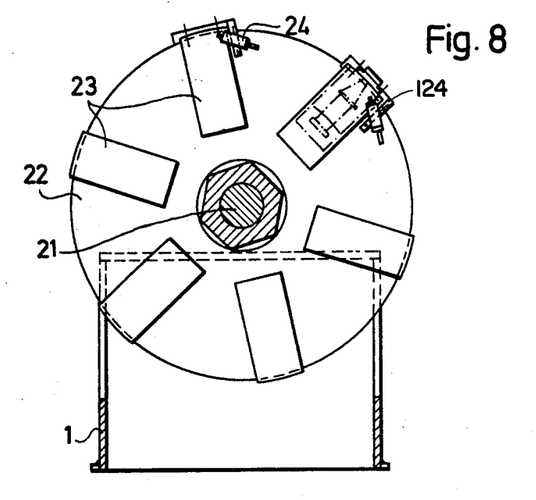
FIG. 8 is a front partly sectional view, as seen from the space between the rotatable plates, and shows one of these plates together with its half-moulds.

When the pairs of half-moulds 23 arrive, in the course of their rotation on their associated plates 22, at the point at which a section cut off from the extruded tubular profile is located, the half-moulds of the pair approach one another and grasp between them the tubular profiled section, and carry this section during their further rotation with their respective plates 22.

Figure 9:
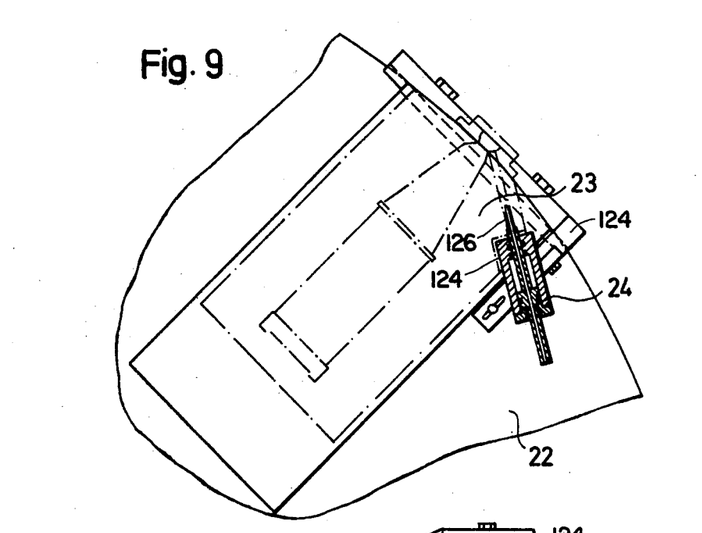
FIGS. 9 and 10 are front and side views respectively, of the half-mould and its associated air injector which are shown in FIG. 8.
Figure 10:
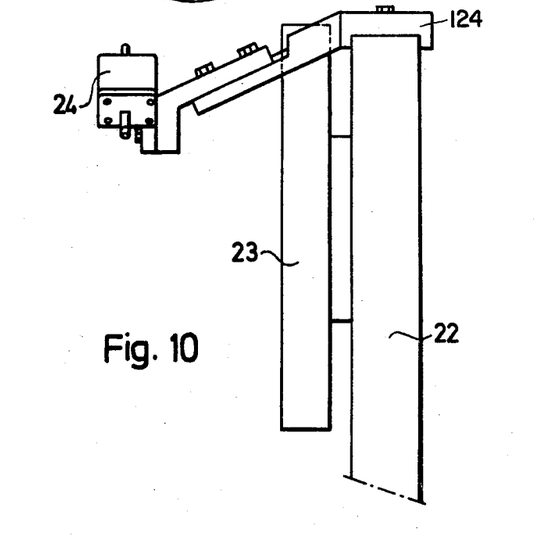
Figure 11:
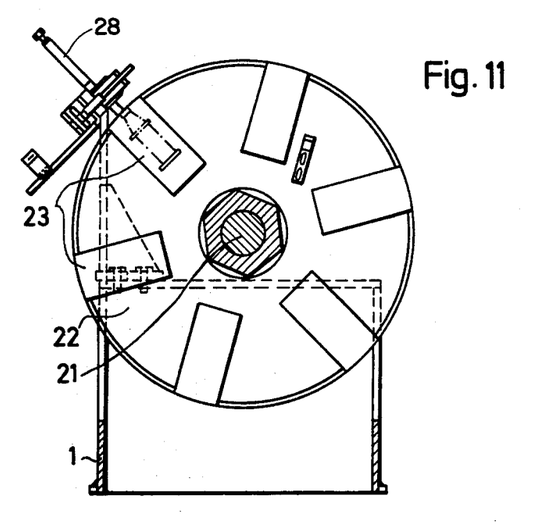
FIG. 11 is a partly sectional view similar to FIG. 8, but seen from the opposite side, and illustrates the other rotatable plate and its cooperating half-moulds, and also illustrates the unit for extracting and deburring the mouldings which is located close to the rotatable plate.

Air injectors 24 (FIGS. 8, 9, and 10) are mounted on one of the plates 22, by means of brackets 124 one of these injectors 24 being provided for each of the half-moulds 23 on this plate 22. As the half-moulds 23 are brought together, the air injector 24 fits into the notch 124 (FIGS. 9 and 12) provided therefor, The air delivery tube 126 is forced outward and pierces the outer wall of the parison. These air injectors 24 are advanced in timed relationship to the other operations performed by the apparatus and blow air into their associated half-moulds 23. Thus, a respective one of the air injectors 24 blows air into an associated one of the tubular profiled sections being rotated by the pair of half-moulds 23 so that, during the rotation of the plates 22 and half-moulds 23, the injected air causes the tubular profiled section to conform to the hollow space defined within the pair of juxtaposed half-moulds 23.

Figure 12:
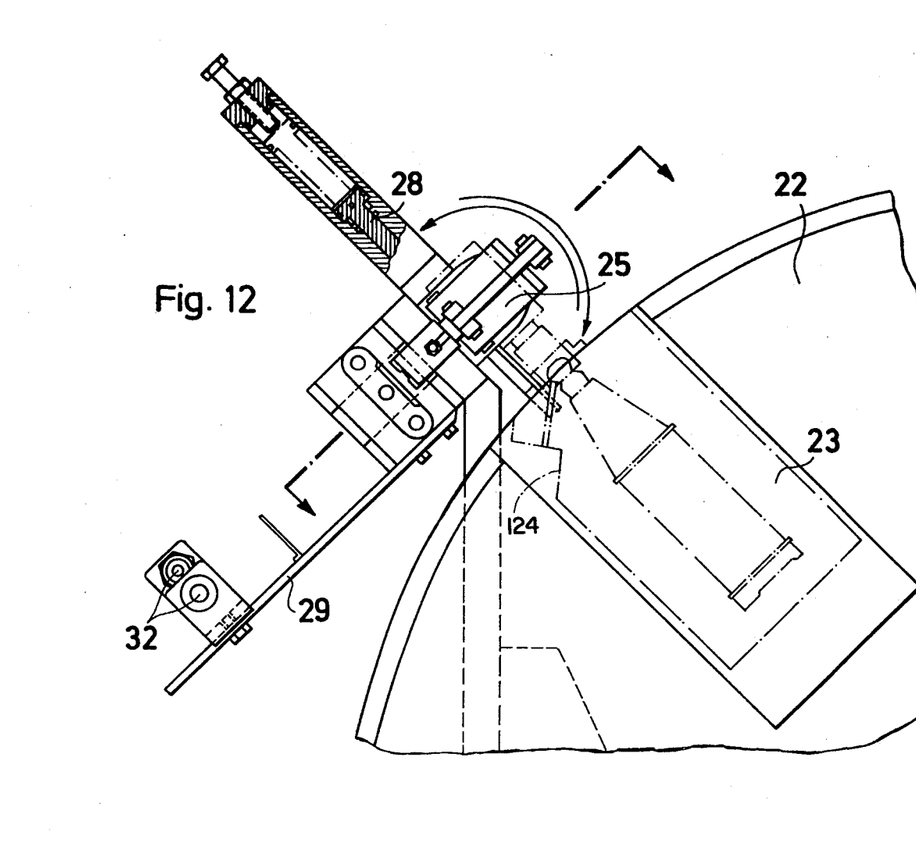
FIGS. 12 and 13 are respectively a partly sectional elevational view and a cross-sectional view, which further illustrate the part of the apparatus illustrated in FIG. 11.
Figure 13:
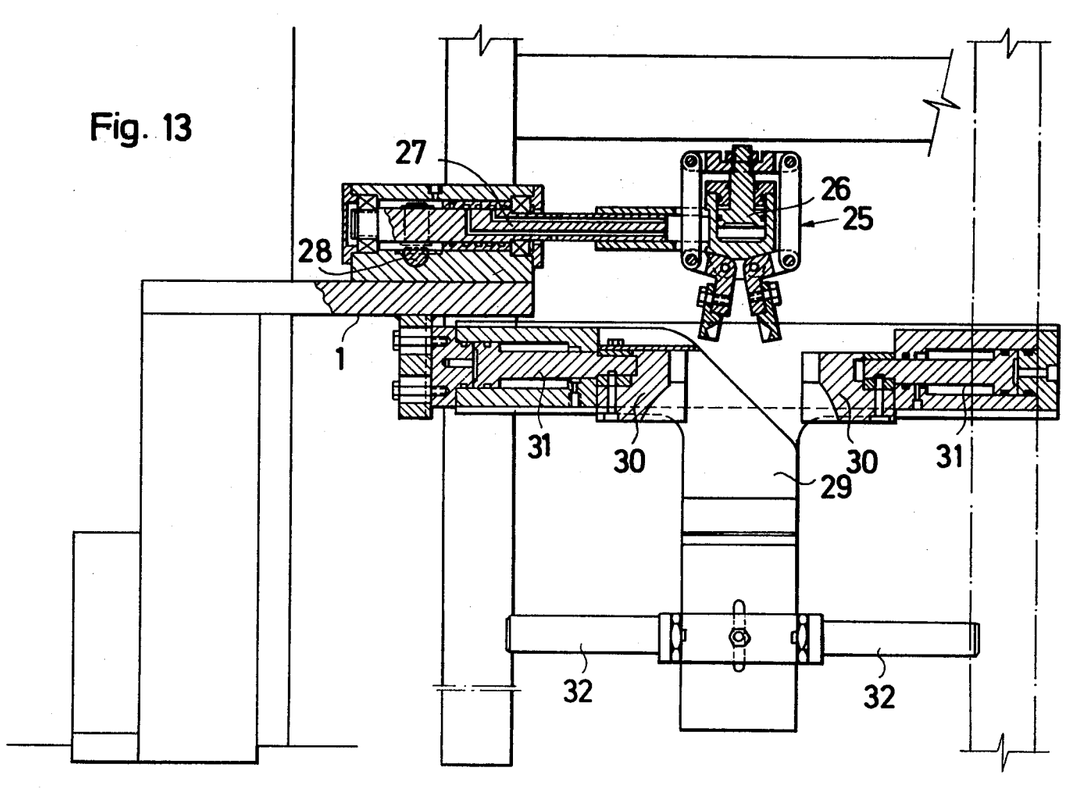

A gripper mechanism 25 (FIGS. 12 and 13) for extracting the blow moulded bodies is mounted on an extension of the bed plate 1 and is actuated by a hydraulically operated piston 26, and is coupled to a hydraulically operated shaft 27 which in turn meshes with the rod of a hydraulic cylinder body assembly 28, which is transversely disposed with respect to the shaft 27. This gripper mechanism 25 is located in the peripheral area between the plates 22 so that when actuated by the rod hydraulic cylinder body assembly 28 it rotates on its shaft and so executes an inward/outward (and vice versa) reciprocating movement, as shown in FIGS. 12 and 13.

The pneumatic action of all these elements is synchronised such that when the pairs of mutually juxtaposed half-moulds 23 approach this position (with a tubular profiled section, blown into the required shape, lying therein) the half-moulds 23 of each pair separate from one another. When the half-moulds arrive at the gripper mechanism 25 in their mutually separated condition the gripper mechanism 25 is pneumatically actuated and grasps the tubular profiled section, and the gripper mechanism is then rotated by pneumatic actuation by the assembly 28, thus removing the tubular profiled section outwards. In this way the pair of half-moulds 23 is left empty so that when the half-moulds reach their upper position and once again approach one another they may receive another tubular profiled section.

A receiving stand 29 (FIGS. 12 and 13) is mounted on the bed plate 1 and is arranged to receive the tubular profiled sections carried thereto by the gripper mechanism. Also attached to the bed plate are two cutters 30 located in separate pneumatic blocks 31 which are synchronised in such a way that they are urged towards one another in timed relationship with the arrival of the tubular profiled sections, these cutters 30 severing burrs from the upper portions of the tubular profiled sections. When the pneumatic blocks 31 are drawn apart from one another and when the gripper mechanism 25 opens, the tubular profiled section which has been blown to the required shape drops. The gripper mechanism 25 then returns to grasp the following tubular profiled section.

Two pneumatically controlled deburring elements 32 are mounted on the receiving stand 29, and lie with their axes parallel but displaced of one another (FIG. 12) and at the level of the burrs attached to the lower end of the moulded tubular section which has been left in the receiving stand 29. By actuating these pneumatically controlled elements 32 in a synchronous manner and in step with the other working movements of the apparatus, the elements 32 approach one another to come into contact with the burrs on the moulding. The pneumatically controlled elements 32 then separate the burrs from the moulded element by a twisting action.

Figure 14:
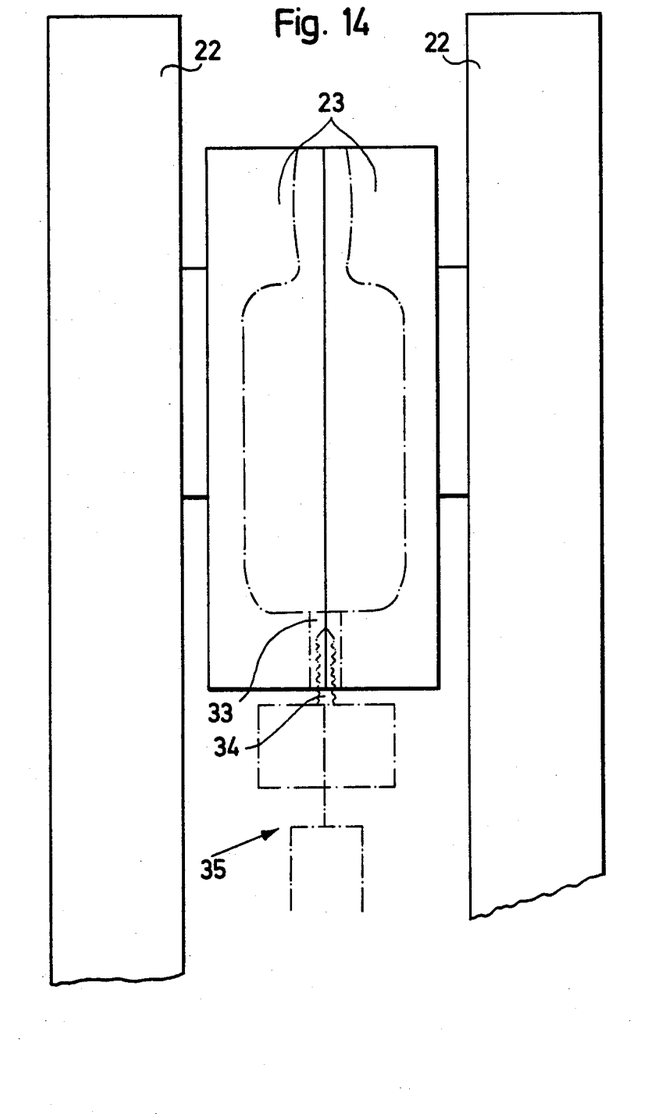
FIG. 14 is a diagrammatic illustration of one assembly for removing burrs from the base of the mouldings.

However, sometimes the material used for the production of the mouldings is such that it is not possible to separate the burrs from the base of the moulding by the above-described twisting action. An alternative method of separating the burrs comprises replacing the elements 32 by blocks 35 (FIG. 14) which can rotate together with the plates 22 and are provided with deburring rods or strips 34, capable of pneumatic actuation. The rods or strips 34 are inserted between the half-moulds 23 so that they remain inserted in the injected plastics material which will constitute the burrs at the base of the moulding. Consequently, when the half-moulds 23 are separated from one another the rods or strips 34 will themselves exert a pulling effect on the burrs on the moulding contrary to the pulling action exerted by the gripper mechanism 25, so that the burrs will be carried away by the rods or strips 34. The rods or strips 34 fit in grooves 33 in the lower parts of the half-moulds 23.

I claim:

1. Apparatus for blow molding comprising:
   a. an extruder for extruding a tubular parison of plastic material;
   b. means in said extruder for varying the thickness of said parison;
   c. at least one pair of half molds having an inner shape defining the desired outer shape of a finished plastic product, said half molds being adapted to close upon said parison while said parison is at least partly attached to said extruder;
   d. means for establishing an electric arc which contacts the parison whereby the parison is softened to be receptive to the subsequent printing thereon of impressions;

e. means for injecting air pressure into the parison grasped by the half molds whereby the parison is expanded to conform to the inner surface of the half molds; and
f. means for opening the half molds.

2. Apparatus as claimed in claim 1 wherein the means for establishing an electric arc comprises an electrode which extends downwardly from the extruder within the tubular parison being extruded, and gripper jaws which are capable of opening and closing, operation of the said jaws being synchronized, and the jaws having half-rings which surround the tubular profiled section, an electric arc being maintained between the half-rings and the electrode through the parison passing between the half-rings.

* * * * *